US006233870B1

(12) United States Patent
Horibata (10) Patent No.: US 6,233,870 B1
(45) Date of Patent: May 22, 2001

(54) METHOD AND DEVICE FOR AQUATIC GREENING IN A SPACE OF A STRUCTURE (76) Inventor: Hiroshi Horibata, No. 25-20, 5-chome, Tokyo (JP)

( * ) Notice: Subject to any disclaimer, the term of this patent is extended or adjusted under 35 U.S.C. 154(b) by 0 days.

(21) Appl. No.: 09/014,184

(22) Filed: Jan. 27, 1998

(30) Foreign Application Priority Data

Jan. 2, 1997 (JP) .................................................. 9-053813

(51) Int. Cl.[7] .................................................. A01G 31/02
(52) U.S. Cl. .............................. 47/62 R; 47/59; 47/62 N
(58) Field of Search .................................. 47/62 A, 62 N, 47/62 R, 58.1, 58, 1.5; 119/224, 226, 227, 228

(56) References Cited

U.S. PATENT DOCUMENTS

| 3,927,491 | * | 12/1975 | Farnsworth | 47/1.2 |
|---|---|---|---|---|
| 4,926,584 | | 5/1990 | Horibata | 47/59 |
| 4,937,969 | * | 7/1990 | Kawabe et al. | 47/17 |
| 5,067,275 | * | 11/1991 | Constance | 47/62 |
| 5,394,647 | * | 3/1995 | Blackford, Jr. | 47/62 |
| 5,771,634 | * | 6/1998 | Fudger | 47/62 |
| 5,887,383 | * | 3/1999 | Soeda | 47/62 R X |
| 5,937,575 | * | 9/1999 | Zobel et al. | 47/62 A |
| 5,961,831 | * | 10/1999 | Lee et al. | 119/227 X |

FOREIGN PATENT DOCUMENTS

| 2818877 | * | 3/1957 | (GB) | 47/48.5 |
|---|---|---|---|---|
| 401320943 | * | 12/1989 | (JP) | 47/62 R |
| 402016922 | * | 1/1990 | (JP) | 47/62 R |

OTHER PUBLICATIONS

Wheeler, R.A. et al., Potato growth and yield using nutrient film technique (NTF). American Potato Journal, vol. 67, pp. 177–187, Jan. 1990.*

Smay, V. Elaine, Modular hydroponics, Popular Science, vol. 212, pp. 118–120, 168, May 1978.*

* cited by examiner

Primary Examiner—Michael J. Carone
Assistant Examiner—Jeffrey L. Gellner (57) ABSTRACT A method and device for aquatic greening in a space of a structure including a storage tank for a cultivating fluid, pump and pipes for circulating the cultivating fluid in a prescribed concentration and flow to a cultivating device, a tank for collecting the cultivating fluid drained from the cultivating device wherein the drained cultivating fluid may be filtered and neutralized or diluted. The cultivating fluid may be a fertilizer fluid or water or a mixture thereof. Electric power for operation may be provided by a solar energy source. The operation of the method and device may be controlled by a computer located in the structure or an adjacent structure. Air may be blown partially or thoroughly into the cultivating fluid. A mesh or net or wires, which may form a trellis and which may be attached to the structure, is adjacent the cultivating device and assist in the growth of the aquatic greening.

30 Claims, 7 Drawing Sheets

METHOD AND DEVICE FOR AQUATIC GREENING IN A SPACE OF A STRUCTURE

FIELD OF THE INVENTION

This invention relates to a device and method for aquatic greening or gardening in a restricted space of a dwelling or building or structure, and particularly an improved greening or gardening device and method used on a part or parts of the exterior of the dwelling or building or structure, such as a roof or passage.

BACKGROUND OF THE INVENTION

Recently house gardening, such as in a vinyl house, is now at the zenith of its popularity and various farm products are shipped to market regardless of the season. Alternately, a greening plan of a space of a dwelling or building or structure, especially a roof space, is on its way to practicality and various devices and methods, which use a fibrous foamed mat or a light artificial soil or stone, have been proposed for the greening. Further, greening concrete, which is porous and can retain moisture therein, has also been proposed to cultivate the plants on a wall surface or an inclined surface or a structure, by seeding or transplantation of the plants on these surfaces.

However, the artificial soil or the fibrous foamed mat for the greening of the structure seems to be easily blown away or carried away by a storm or a strong rain, and may contaminate a dwelling's environment. The greening concrete also seems to be higher in price than the original one, and has fault in its strength due to its porous character.

SUMMARY OF THE INVENTION

A device for hydroponics or aquatic greening in a restricted space of a dwelling or building comprises at least an aquatic rearing and cultivating device, such as an aquatic planter or a ditch which is filled suitably with culture fluid or water, and at least an aquatic float provided with plural planting beds.

A known aquatic planter may be used for soil planting, however, it is preferable to use a special one which is suitably designed to be in conformity with a restricted space in a dwelling or building, such as a passage of an apartment house, a porch or roof of a private house, etc., or a long ditch or conduit along with a passage or a fence of a roof of a dwelling or building, which is specially designed for an aquatic planting and permanently settled thereon.

A greening nursery bed of the present invention may be an aquatic float disclosed in U.S. Pat. No. 4,926,584, provided with or without a supplemental large float in which the former are set into the holes on the later and floated in or supported on the aquatic planter.

However, preferably a cover plate is supported on inside projections of the planter, the ditch or conduit and is provided with many holes or slits to insert the seed cages or beds, just as described above.

The aquatic planter may also be provided with a set of vertical, planar or inclined trellis or lattice means or supports to lead growth of the plants, such as a morning-glory, a cucumber, a watermelon, etc., which is disposed on or with a part of a dwelling or building, such a fence on the roof or the passage described hereinbefore, by ropes or binders.

The culture fluid or water in the aquatic planter is supplied from a storage tank, and circulated or transferred periodically to or from the other planter, with or without blowing into the air.

Rain water or town water may be used for the culture fluid, which may be prepared with a fertilizer for aquatic planting in the storage tank, prior to periodical circulation.

The blowing into the air for the aquatic planter may be performed by an air pump equipped on the planter and mainly driven with a solar electric means even if commercial electric power is practical.

The aquatic planter or the aquatic greening system may be controlled by a computer to cultivate the flowers, vegetables, etc., in a restricted space or a dwelling or building here and there, for labor saving, and may use partially or mainly the solar energy and rain water for material saving.

Accordingly, it is an object of the present invention to provide an aquatic greening device and method for cultivation of plants in a restricted space of a dwelling or building.

It is another object of the present invention to provide an aquatic greening device and method for cultivation of plants in a restricted space of a dwelling or building which uses natural energy and material.

It is a further object of the present invention to provide an aquatic greening device and method for cultivation of plants in a restricted spaced of a dwelling or building, here and there, which is controlled automatically with a computer.

It is a further object of the present invention to provide an aquatic greening device and method for cultivation of plants in a restricted spaced of a dwelling or building, which can control heat in the dwelling or building, and absorbs carbonic acid gas in the air, due to the plants cultivated thereon.

It is an object of the present invention to provide a dwelling or building having at least an aquatic plant garden, etc., thereon, for private use.

It is still a further object of the present invention to provide a dwelling or building having at least an aquatic green curtain or screen with the plants cultivated thereon for a fence or net.

It is still another object of the present invention to provide a dwelling or building having at least an aquatic farm block on its roof provided with a set of vertical planar trellis or lattice means for the plants.

It is still another object of the present invention to provide a dwelling or building having at least an aquatic farm block on its roof provided with an inclined trellis or lattice means which is disposed against a fence or a net on the roof It is a further object of the present invention to provide a dwelling or building having arranged permanently at least an aquatic farm block and/or aquatic flower garden on its roof

DETAILED DESCRIPTION OF THE PREFERRED EMBODIMENTS

Figures 1, 2:
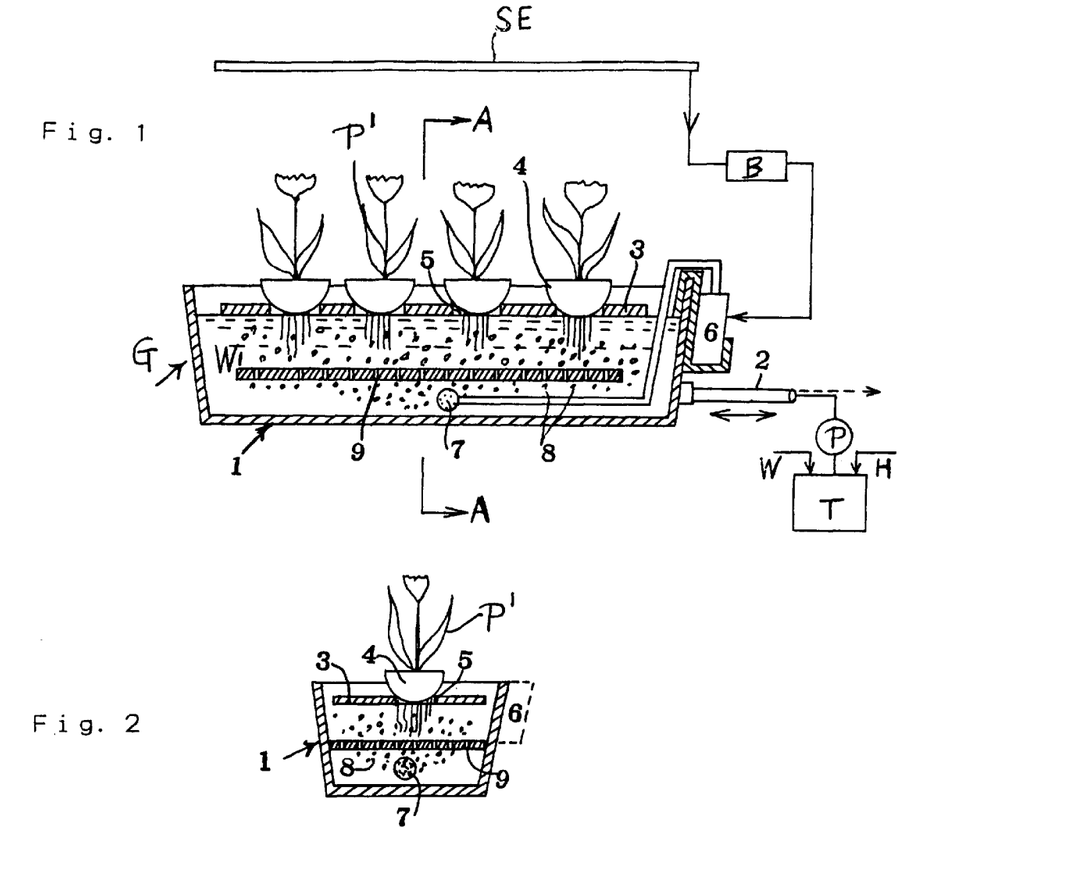
FIG. 1 is a sectional front view for an aquatic greening device of the present invention.
FIG. 2 is a sectional side view of FIG. 1, along line A—A.

Referring to the drawings and particularly FIGS. 1 and 2, an aquatic greening or gardening device G of the present invention is in a restricted space of a dwelling or building. The device G comprises fundamentally an aquatic planter 1 for a plant P' filled with culture fluid W' or water W to a suitable level, a supplemental float or cover 3 provided with holes 5 on which seed beds 4 is inserted, respectively, a circulation means for the culture fluid W' or water W, including pipes 2 and a suction or circulation pump P, a storage tank T for the culture fluid W' or the water W, a solar electric system SB and an air pump 6 which blows the air into the culture fluid W' or the water W through an air discharge means 7.

Figure 4:
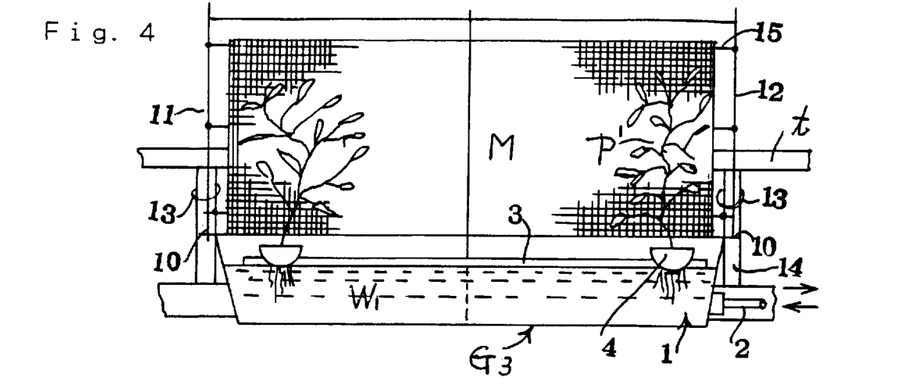
FIG. 4 is a sectional front view for another aquatic greening device of the present invention showing it arranged with a fence of a roof or passage for a dwelling or building through a vertical trellis or lattice means for the plants.

In such an aquatic greening device, the culture fluid may be prepared by mixing in the storage tank T water, especially rain water W from a storage tank (not shown) and fertilizer H for hydroponics farming or gardening, and circulated into the greening device through the pump P. The device may also be set along a fence t in a passage, a veranda, or a roof of a dwelling or building to be used for leading a vertical growth of the plants on the greening device, as shown in FIG. 4 and described hereunder.

The culture fluid W' or water W in the planter 1 may be blown in the air by the air pump 6 driven periodically with power from a solar battery B to activate all of the plants on the culture beds 4 by oxygen in the bubbles through holes 8 of a buffer plate 9.

Figure 3:
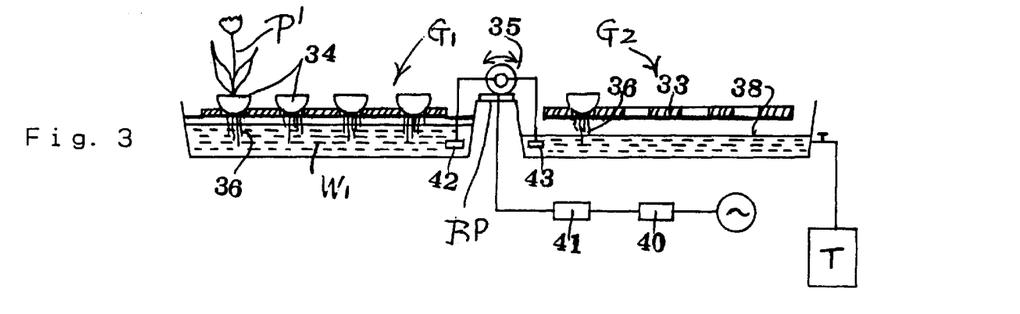
FIG. 3 is a sectional front view for another aquatic greening device of the present invention.

The embodiment in FIG. 3 shows connected aquatic greening devices G1, G2, but lacks the blowing means of FIG. 1. However, the greening devices G1, G2 have a reversible water pump 35 on a connecting base plate BP between a flange of the devices G1, G2 to replace periodically the culture fluid W' from the devices G2 to G1 or from G1 to G2, and supply oxygen to the plants P on the seed beds 34 during a fixed time, from their roots 36 exposed in the air in either of the greening devices G1, G2, in a known manner.

In this embodiment, the reversible water pump 35 is controlled automatically with a timer 40 and a current exchange-over switch 41 and the direction of its rotation is periodically changed over with the above control means during a fixed time to replace the culture fluid W' into the other greening device G1 or G2 through output and input holes 42, 43 of the pump 35. Accordingly, the roots 36 under a supplemental float or cover 33 in either greening device G1 or G2 is exposed to the air, due to a space 38 underneath the float 33 supported on the inclined inside walls of the devices G1 or G2, when the water level is significantly decreased.

The aquatic greening devices G1, G2 may also be arranged adjacent the fence or net of the passage, the porch or the roof of the dwelling or building, as mentioned before.

Figure 5:
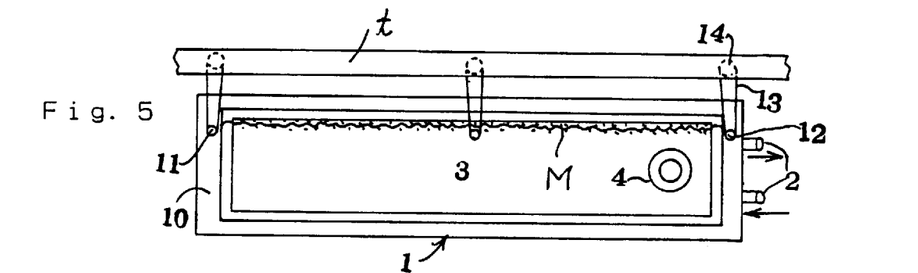
FIG. 5 is a plan view of FIG. 4.
Figure 6:
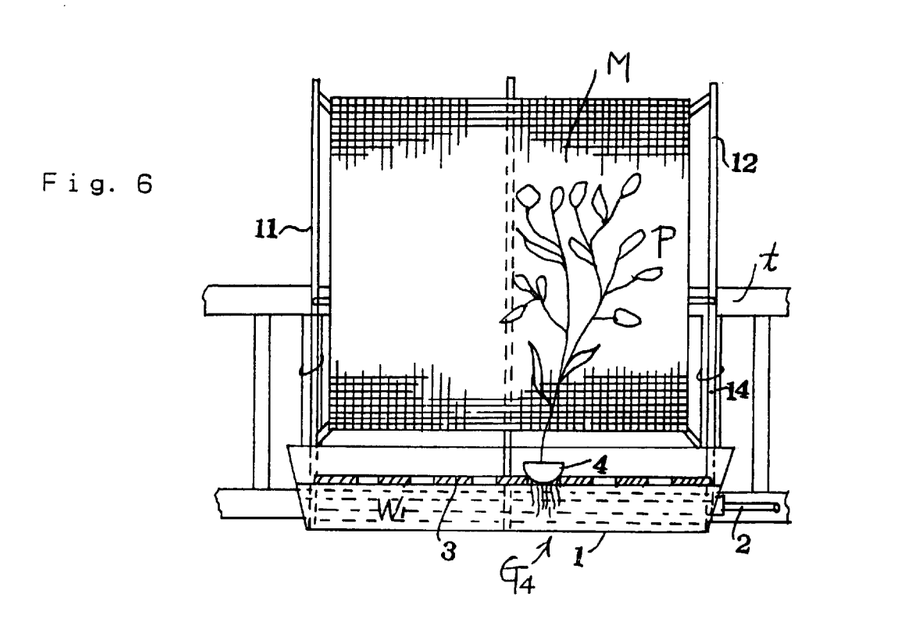
FIG. 6 is a sectional front view, as in FIG. 4, except for supporters of the vertical trellis or lattice means for the plants.

FIGS. 4 to 6 show aquatic greening devices G3, G4, respectively, installed adjacent fence t of the dwelling or building and combined with legs 14 of the later by ropes or binders 13 through supports 11, 12 of a vertical trellis or lattice M for plants P. The supports 11, 12 in FIG. 4 are on a flange 10 and the vertical trellis or lattice net M is stretched between supports 11, 12 by horizontal ropes 15. In FIG. 6 the supports 11, 12 of the net M are joined directly with the legs 14 of the fence t, because the device G4 does not have a flange and stretched between the supports 11, 12, as is in the same manner of FIG. 4.

The stretched vertical trellis or lattice M lead, respectively, the plants especially vine plants such as a morning glory, in all directions to grow on it, and forms a green curtain beside the fence t to shut out sunlight or public notice from the dwelling or building, and to prevent a fall of things.

Figure 7:
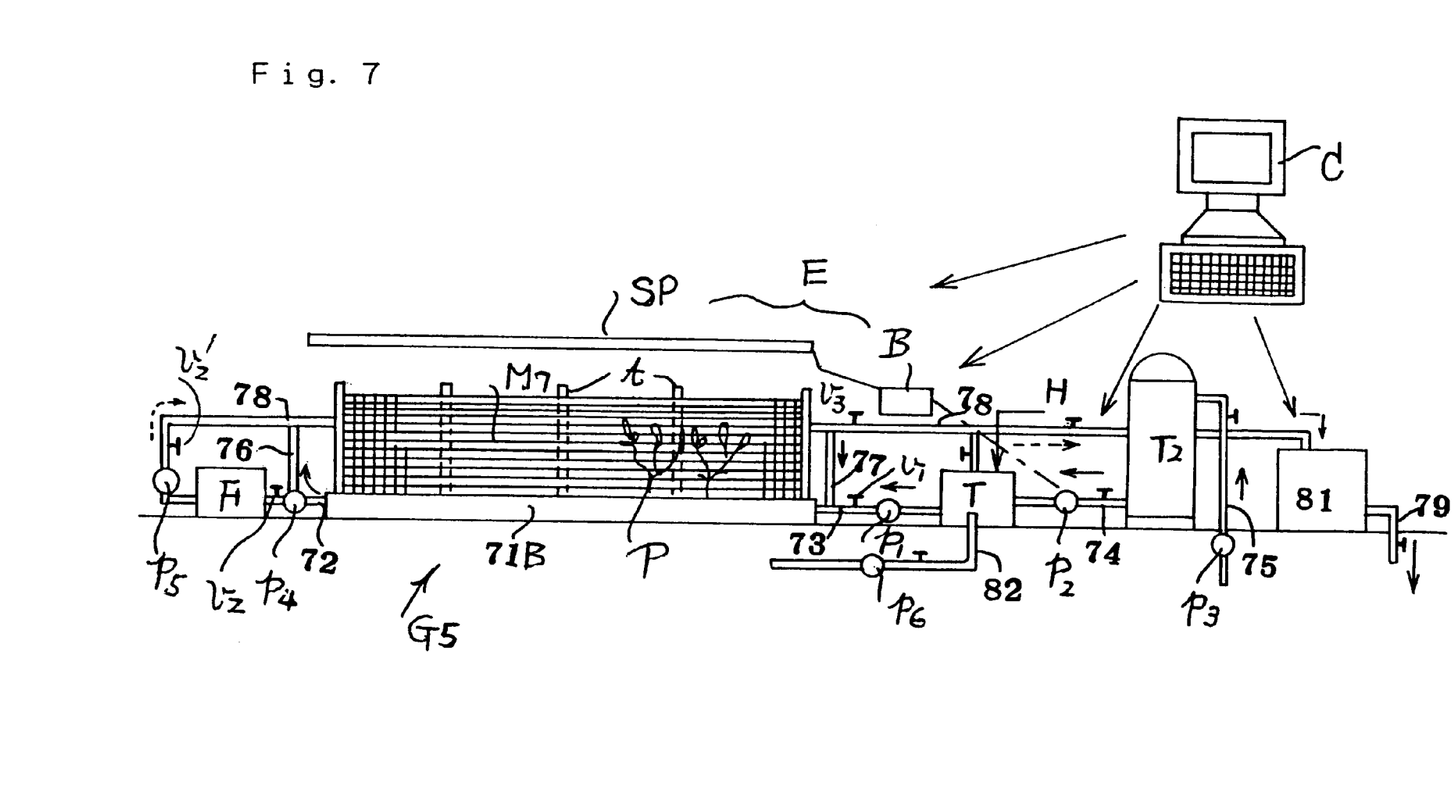
FIG. 7 is a schematic flowsheet of an aquatic greening controlled by a computer.

FIG. 7 shows schematically an aquatic greening device G5 which uses natural energy and rain water, in or on the restricted space of the dwelling or building, such as a roof, passage, veranda, etc. The device G5 comprises an aquatic planter 71 or an aquatic long ditch 71B connected with a water tank T2 through a culture fluid tank T and a filter F provided with a circulation pipe 78 connected with the planter 71 or the ditch 71B through a pipe 77.

The aquatic greening device G5 is also provided with a solar electric generating set E comprising a solar panel SP and a battery B to supply partially an electric power for the system, and may be controlled automatically by a computer C, together with the other systems on the same or other dwelling or building, according to well known prior art.

The aquatic planter 71 or the aquatic long ditch 71B may be plural planters 1 connected with the others mutually through pipes 2, shown in FIGS. 1, 3, 4, or 6, and be set detachably with a part of the dwelling or building such as a fence t in the roof or veranda. However, it is preferable that the long aquatic ditch or conduit is settled permanently on the restricted space of the dwelling or building, such as the roof, without hindrance of the function for the other equipment on it, when the dwelling or building is constructed.

Figure 8:
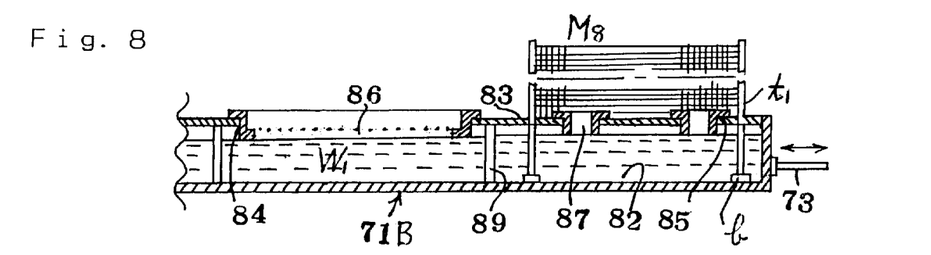
FIG. 8 is a partial sectional front view of a further aquatic greening device in a type of a ditch, provided with a vertical trellis or lattice net for the plants.
Figure 9:
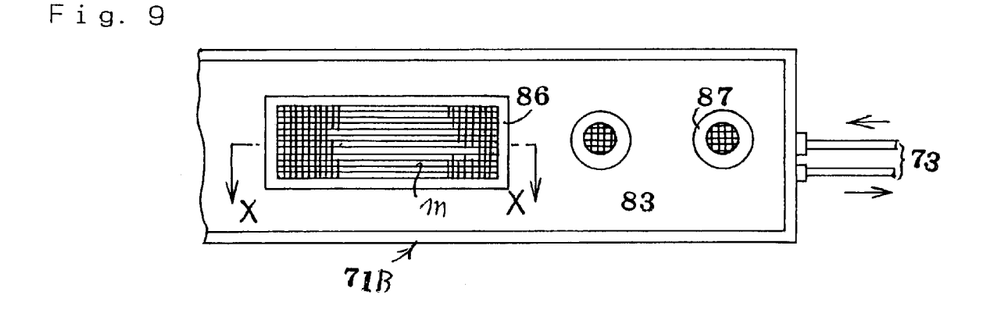
FIG. 9 is a plan view of FIG. 8 omitting the vertical trellis or lattice net for the plants.

The long ditch or conduit 71B for the aquatic planter 71 may be provided with plural seed beds, such as the aquatic floats, disclosed in U.S. Pat. No. 4,926,584, and the supplemental floats or cover 3 shown in FIGS. 1, 4 or 6, but it may be preferable to provide a cover plate 83 supported on its upper-most inside and the later provided with holes and/or slits 84, 85, in which circular or square seed beds 86, 87 are set thereon, as shown in FIGS. 8 and 9 described hereinafter.

The ditch 71B also juxtaposes a trellis or lattice M set with poles or the fence equipped in a restricted space of the dwelling or building etc., described hereinbefore, for leading vertical growth of the plants P' in the seed beds 86, 87.

The storage tank T for the culture fluid is connected with the ditch 71B through a pipe 73 and a supply pump P1, and with the water storage tank T2 through a pipe 74 and a pump P2. The tank T may supply also the culture fluid into another parallel aquatic greening means (not shown) through a pipe 82 with a pump P6, while it prepares mainly a culture solution by adding the water supplied from the storage tank T2 and a water soluble fertilizer for hydroponics, such as "Hylizer" described hereunder, if it is necessary to use the culture fertilizer solution but not the water.

The culture fluid generally is circulated repeatedly from the tank T' to the ditch 71B through a pipe 73 by the supply pump P1 and pipes 76, 77, 78 by a pump P4, without blowing into the air as shown in FIG. 1. The fluid may also be circulated into the ditch 71B, after filtering in a filter F through the pipes 72, 77, 78 by a pump P5, when it is soiled with dust, such as cut roots, sediments, etc., and to which may be added the fresh culture fluid from the storage tank T by means of the pump P1 through the pipe 73, if the fluid has been decreased. The culture fluid is finally drained from a pipe 79 after it is neutralized or diluted in a neutralizing tank 81, when the farm products have been harvested or its agricultural effects have been lost.

In operation of the present aquatic greening, firstly the rain water from an underground storage tank (not shown) is charged into the water tank T2 through the pipe 75 by the pump P3 and thereafter to the culture fluid tank T through the pipe 74 by the pump P2. If the plants to be cultivated on the ditch 71B require the use of the aquatic fertilizer solution, the aquatic fertilizer H is added therefore to the water and discharged into the ditch 71B by the pump P1 through the pipe 73, after the solution is arranged in a suitable concentration. However, if the water can be used as the culture fluid, it may be charged directly into the ditch 71B.

The seeds or young plants thereafter are sowed or transplanted on the rectangular or round seed beds or cage 86, 87 supported on the cover 83 of the ditch 71B described hereafter. The plants P' grown on the seed cage 86, 87 are supplied continuously with the fertilizer solution to their roots and grow along the vertical trellis or lattice mesh or net M7 stretched and joined between the poles forming the fence t on the roof or the passage of the dwelling or building.

The fertilizer solution may be continuously or periodically circulated from one side of the ditch 71B through pipes 72, 76, 77, 78 by the pump P4. If the solution has been seriously contaminated with cut roots of the plants, etc., it may also be purified with the filter F and circulated to the other end of the ditch 71B by the pump P5, through the pipes 73, 77, 78, after releasing valves V2, V2'.

The solution is also supplied additionally from the tank T1, if it has decreased to a selected fluid level in the ditch 71B, through the pipe 73 and the pump P1 after releasing a valve V1, and finally discharged from the ditch 71B to a neutralizing tank 81, after releasing a valve V3 and drained from a pipe 79, after the neutralization or dilution until a legal permissible limit for the discharge.

The plants P', after cropping or blooming in the ditch 71B, are taken off together with the vertical trellis or lattice net M2 and a new aquatic greening is repeated with the same or different culture fluid from the storage tank T.

In the aquatic greening system, young leaf vegetables, such as a seed leaf of radish, a bean malt such as a sprout or a bulbous plant such as tulip or crocus, etc., may be cultivated with water, however, almost all of the plants have to use a culture solution for their growth.

An aquatic fertilizer used in the present greening system is "Hylizer" (trade name) and its concentration with respect to each cultivated plant is a follows:

| Cultivated Plants and Concentrations of "Hylizer" Solution | | |
|---|---|---|
| First Group: | Cucumber, Melon, Watermelon Pumpkin, Cabbage, Chinese Cabbage, Rose, Carnation | 10 liter of water per 26 gram of Hylizer |
| Second Group: | Honewort, Celery, Parsley Eggplant, Pimento, Tomato | 15 liters of water per 20 gram of Hylizer |
| Third Group: | Lettuce, Turnip, Spinach Welsh, Chrysanthemum | 20 liters of water per 20 gram of Hylizer |
| Fourth Group: | Cleson, Strawberry | 30 liters of water per 20 grams of Hylizer |
| Fifth Group: | Pot Marigold, Horseradish, Sweet Pea, Sun Plant, Orchid | 40 liters of water per 20 grams of Hylizer |

FIGS. 8 and 9 shown another embodiment of a vertical trellis or lattice net or mesh M8 set in a long ditch 71B as shown in FIG. 7. The trellis or lattice M8 is stretched between two or more supports tl which are inserted in projections b on a bottom 82 of the ditch 71B through a cover 83. The cover 83 may also be supported on multiple pairs of supports 89a along both the longitudinal inside walls of the ditch 71B and disposed thereon the circular or square seed beds 86, 87, so that their undersurface are in contact with the culture fluid W1 which is charged through the pipe 73.

Figure 10:
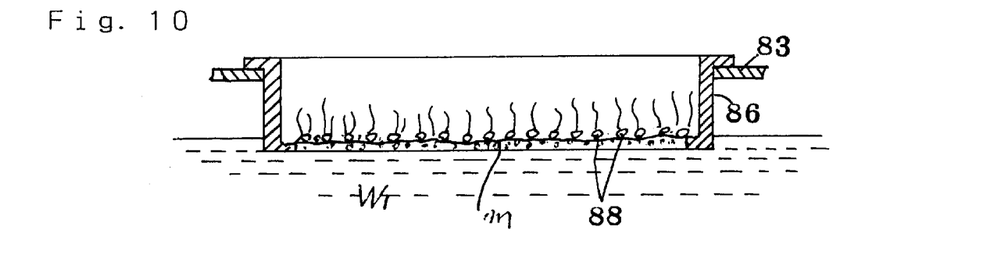
FIG. 10 is a sectional front view through a line X—X in FIG. 9, and shows a meshed rectangular seed bed or plant nursery used in the present aquatic greening.
Figure 11:
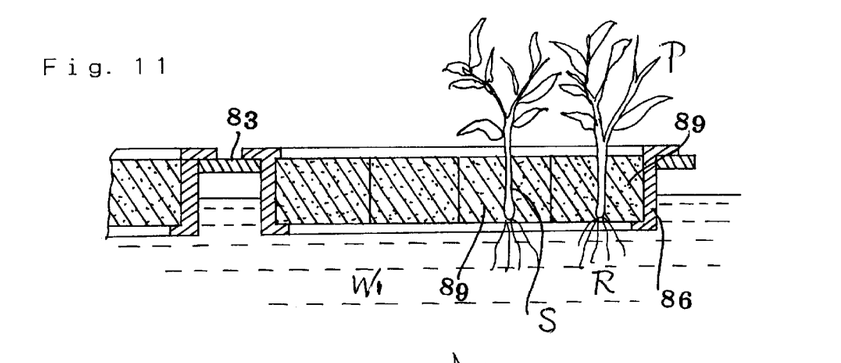
FIG. 11 is the same view as in FIG. 10 and shows a foamed polyurethane seed bed.
Figure 12:
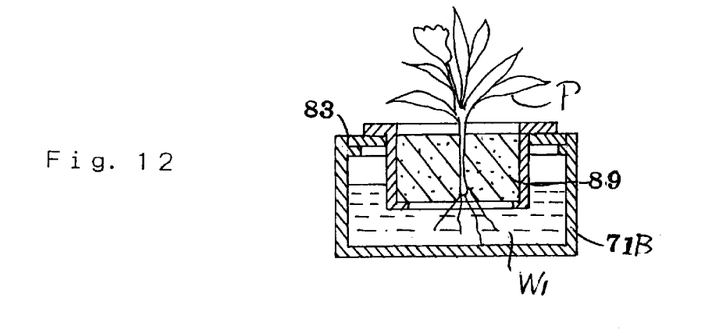
FIG. 12 is a sectional side view of FIG. 11.

The little plants, such as the seed leaf of radish, lean malt, etc., which have a short term growth, may be planted on a mesh m of the seed bed 88, as shown in FIGS. 9 and 10. However, it the plant is a large one, such as liana, or a seedling for transplanting it is necessary to plant on or in a sponge material such as a foamed polyurethane 89, as shown in FIGS. 11 and 12, to hold their stems S firmly so that the plant may grow without falling down, by absorbing the culture fluid W1 from the root R.

Figure 13:
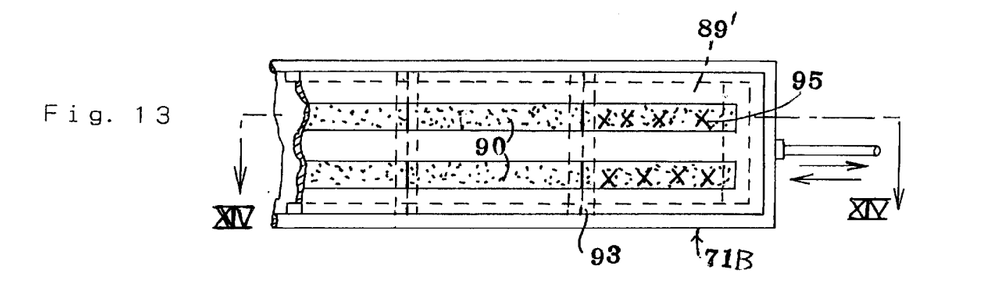
FIG. 13 is a partial plan view of still another aquatic greening device of the present invention and shows a foamed polyurethane seed bed provided with two series of holes or crevices for seeding.
Figure 14:
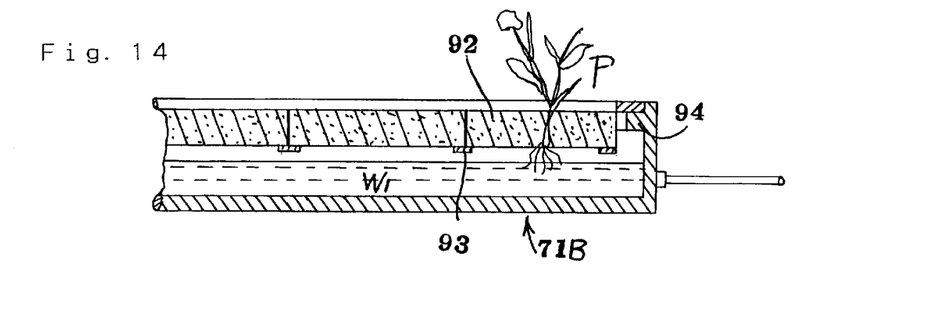
FIG. 14 is a partial sectional front view of FIG. 13 cut through a line XIV—XIV.

In the case of an aquatic planting of a vegetable such as lettuce, it is preferable to plant it in two ridges 90 or more of the foamed polyurethane bed 89 due to a large crop from the ditch 71B. The polyurethane bed 89 is supported on crosspieces 93 furnished detachably on both inside walls of the ditch 71B and sectioned on the crosspieces into blocks 92 for easy treatment of the crop. The ridges 90 are made by two rows of slits on a cover 83, when the cover is set forcibly on lateral inside projections 94 of the ditch 71B, and seeds or seedlings of lettuce are sown or transplanted in crevices 95 on the ridges 90.

Figures 15, 16:
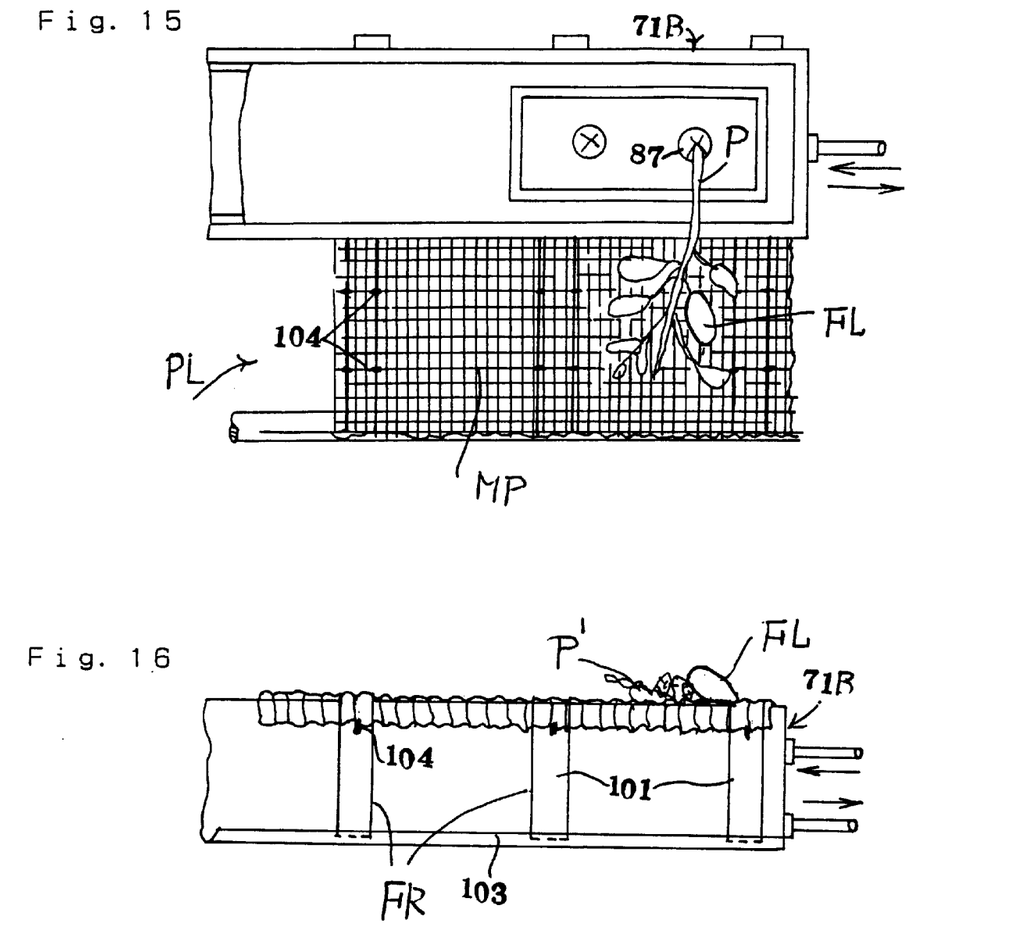
FIG. 15 is a partial plan view of an aquatic greening device of the present invention combined with a planar trellis or lattice means for the plants thereon.
FIG. 16 is a front view of FIG. 15.
Figure 17:
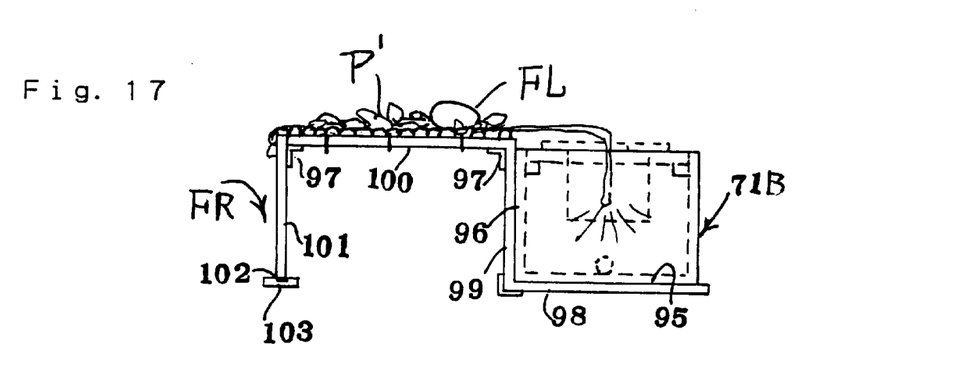
FIG. 17 is a side view of FIG. 15.

FIGS. 15 to 17 show a planar trellis or lattice means PL for the present invention, and comprises frames FR which are detachable from a ditch 71B, as shown in FIG. 9, and each is fabricated from separated frame pieces 98, 99, 100, 101 and a net or mesh MP, which is provided on the planar frame piece by pins 104. The frame pieces 98, 99, 100, 101 are connected with hinges 97 and the connected frame pieces are bent at right angles from the first end frame piece 98, under a bottom 95a of the ditch 71B to the second frame piece 99 along with vertically outer-surface 96 of the ditch 71B, and thereafter a third piece 100 is bent further at the same angle. The last frame piece 101 is bent more downwardly at a right angle so that its end 102 is received into a recess on a frame holder 103 to form a fixed wisteria trellis beside the ditch 71B, with three frame pieces 99, 100, 101.

The net MP is stretched on the multiple frames FR that is respectively arranged in parallel, as shown in FIGS. 15 and 16, and is fixed on the frames by pins 104. The plant P', such as melon, green pea, etc., is cultivated in a seeding cage or bed 87 on the ditch 71B and grown on the trellis or lattice net MP to form a crop of fruit or melon FL in the restricted space of the dwelling or building, such as its roof or veranda.

Figure 18:
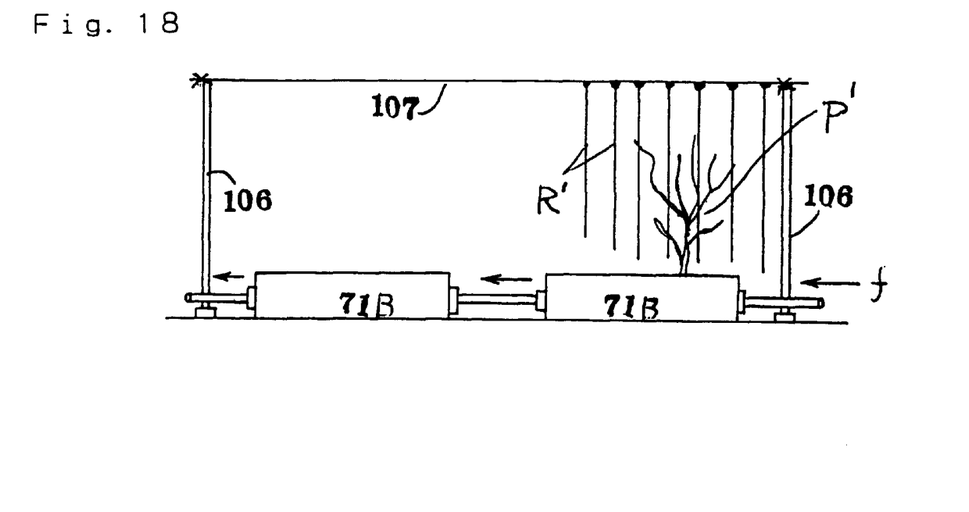
FIG. 18 is a front view of an aquatic greening device shown in FIG. 15 combined with a vertical rope trellis or lattice means for the plants.

In FIG. 18, a plant, for example, morning glory, is cultivated in a series of ditches or planters 71B with vertical leading ropes R' hanging down from lateral wire 107 between poles 106 on a roof or the dwelling or building, and makes a green curtain or blind for the dwellers. The culture fluid is, of course, circulated into the planters 71 or ditches 71B along the direction of arrows f from the storage tank (not shown) described hereinbefore.

Figure 19:
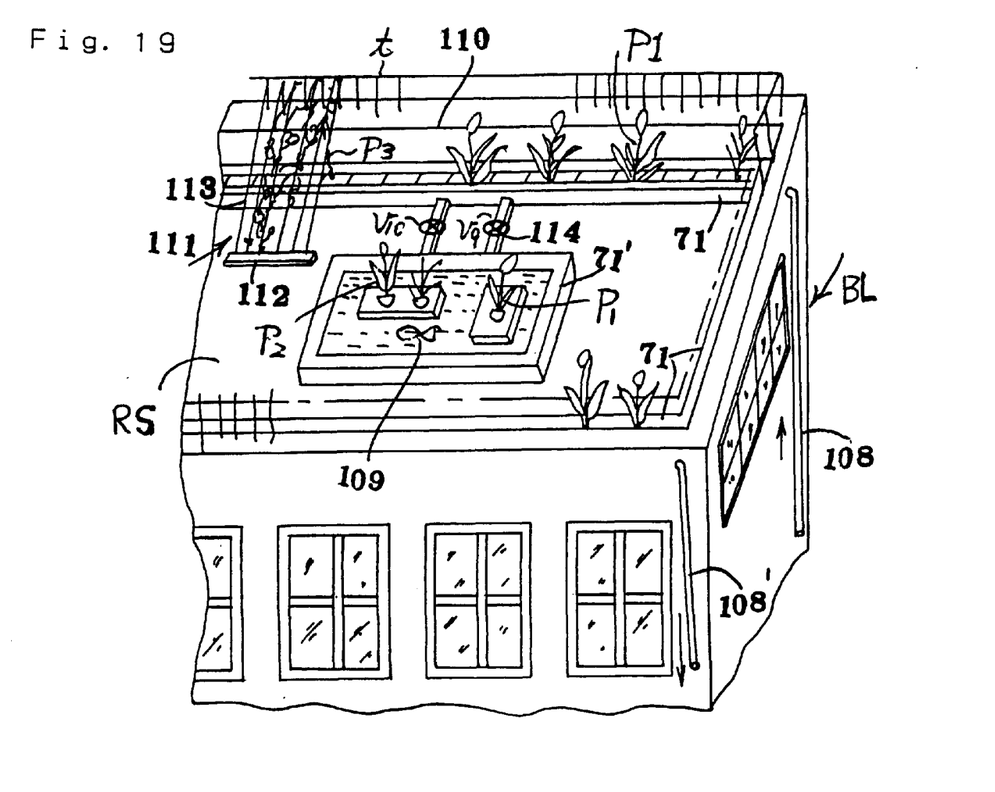
FIG. 19 is a perspective view of a building having arranged permanently thereon aquatic greening devices on its roof.

A building BL, as shown in FIG. 19, is covered with flowers P1, P2 and vegetables or fruits P3 grown in connected ditches 71B arranged about an inside of the fence t on a wall 110 on its roof The ditch 71B may be replaced by a series of connected planters, as shown in FIG. 18, and supplied with the culture fluid, such as water or a culture solution, from a pipe and drained to a storage tank or drainage (not shown) through a pipe 108, after being treated suitably as mentioned before. The fence t and a latch means 112, with ropes or wires 113 on a surface of the roof RS, are used for as set of an inclined trellis or lattice net 111 for the purpose of cultivating the flowers or vegetables and the crops may be sold or used for market or private use.

A pool 71', controlled by valves V9, V10, may be installed on the roof surface RS and supply the water or culture solution from pipes 114 through the ditch 71B to cultivate the flowers P1, P2 on the aquatic floats, as mentioned before, and may include raising fish 109, if the fruit is water.

The roof of the dwelling or building may be covered with a vinyl sheet or glass to protect the plants, and may be provided with a solar generator and a storage tank for rain water to be used partially as electric power or a natural resource for the present system. The aquatic greening or gardening on single or multiple dwellings or buildings may be controlled in the same building or another building by the computer as described hereinbefore.

Thus, the aquatic greening provides not only many fresh flowers and vegetables but also many fruits such as melon, strawberry, watermelon, etc., for the dwellers, commuters, managers and their families. The plants cultivated in the restricted spaces in the dwellings or the buildings also absorb carbonic acid gas from the atmosphere and release oxygen into the air to purify the town's environment, and control the temperature of the dwelling or building in which they are cultivated.

The plants, such as morning glory, cultivated with the vertical trellis or lattice net or ropes, along with the fence of the dwelling or building, may be a green curtain or fence to intercept the field of vision from outside, and to prevent a fall or a person or an object from the dwelling or building.

In the present invention there has been described and pointed out the fundamental novel features as applied to a preferred embodiment. It will be understood that various omissions and substitutions and changes in the form and details of the aquatic greening system and device and method illustrated may be made by those skilled in the art without departing from the spirit of the invention. The invention therefore is to be limited only by the scope of the following claims.

What is claimed is:

1. A method for aquatic greening by one or more plants comprising the steps of:

providing a structure for locating a cultivating device for support of the plants;

providing in the structure and forming part of the structure and spaced externally from the cultivating device means for supporting the plants during plant growth;

providing storage means for a cultivating fluid compatible with the plants for growth of the plants;

providing a dilution tank for the cultivating fluid;

circulating the cultivating fluid in a prescribed concentration and flow to the cultivating device;

allowing the cultivating fluid to drain from the cultivating device into the dilution tank and;

filtering and neutralizing or diluting the drained cultivating fluid.

2. The method of claim 1 wherein the cultivating fluid comprises a culture fluid or water or a mixture thereof.

3. The method of claim 1 wherein solar energy is used as at least a source of electric power for the method.

4. The method of claim 1 wherein the aquatic greening is controlled by a computer located in the structure or an adjacent structure.

5. The method of claim 1 wherein air may be blown partially or thoroughly into the cultivating fluid seperate from the circulating.

6. The method of claim 1 wherein the cultivating fluid is provided to the cultivating device such as to maintain a constant level at a constant time interval.

7. A device for aquatic greening by one or more plants comprising:

at least one cultivating device, the cultivating device being located in a structure and provided with at least one means for providing plant growth;

means located in the structure and forming part of the structure and spaced externally from the cultivating device for supporting the plants during plant growth;

a circulation means for cultivating fluid for the cultivating device, the cultivating fluid being compatible with the plants for growth of the plants;

a storage tank for the cultivating fluid connected to the circulation means, the storage tank being connected to the source of the cultivating fluid;

a dilution tank for receiving the cultivating fluid which is drained through the cultivating means; and a filter means connected to the dilution tank.

8. The device of claim 7 wherein electric power for the device is provided by solar energy means.

9. The device of claim 7 wherein the cultivating fluid is a culture fluid or water or a mixture thereof.

10. The device of claim 7 wherein the aquatic greening is controlled by a computer located in the structure or an adjacent structure.

11. The device of claim 7 comprising means for blowing air partially or thoroughly into the cultivating fluid seperate from the circulation means.

12. The device of claim 11 comprising a buffer plate for the blowing air.

13. The device of claim 1 comprising at least a pair of aquatic planters, and a reversible pump having a filter means for periodically providing the cultivating fluid to a selected one of the pair of aquatic planters.

14. The device of claim 7 wherein the cultivating device is provided with supports adjacent a side of the cultivating device and a vertically oriented net or mesh disposed on the supports for assisting in the growth of the aquatic greening.

15. The device of claim 14 wherein the cultivating device is located adjacent to and substantially parallel to a part of the structure and means for securing the mesh or net to the supports.

16. The device of claim 15 wherein the securing means connects the mesh or net to the part of the structure.

17. The device of claim 7 wherein the means for providing plant growth comprises at least one rectangular or circular seed bed.

18. The device of claim 7 wherein the cultivating device comprises a covered ditch or trough.

19. The device of claim 18 wherein at least one vertically oriented mesh or net is attached to one side of the ditch or trough for assisting in the growth of the aquatic greening.

20. The device of claim 19 wherein the mesh or net is attached to a frame to form a trellis along the one side of the ditch or trough.

21. The device of claim 20 wherein the frame comprises at least four frame pieces, three of the frame pieces being respectively connected at a right angle junction of the pieces by a respective one of three hinges and the fourth frame piece having one end connected to one of the three frame pieces and another end to a frame holder.

22. The device of claim 7 wherein the means for providing plant growth is at least one sponge seed bed.

23. The device of claim 22 wherein the cultivating device comprises a ditch or trough having a cover and the sponge seed bed is supported on detachable cross-pieces attached between sides of the ditch or trough and the sponge seed bed is under the cover.

24. The device of claim 7 comprising a wire stretched between poles located adjacent to the cultivating device and ropes suspended from the wire and toward the cultivating device for assisting in the aquatic growth.

25. The device of claim 7 wherein the means for providing plant growth is at least one polyurethane seed bed.

26. The device of claim 7 wherein the means for providing plant growth is at least one detachable seed bed.

27. The device of claim 7 comprising means provides for neutralizing or dilution of the drained cultivating fluid.

28. The device of claim 7 wherein at least the cultivating device may be located in a space of the structure different than the storage means or the dilution means or the circulating means or the filter means.

29. The device of claim 7 wherein at least the cultivating device is located in a room or roof or passage or a veranda or a porch of the structure and the storage means or the diluting means or the circulating means or the filter means is located in a space of the structure other than the cultivating means.

30. The device of claim 7 wherein the means for supporting the plants during plant growth is affixed, in whole or in part, to the structure.

* * * * *

UNITED STATES PATENT AND TRADEMARK OFFICE
CERTIFICATE OF CORRECTION

PATENT NO. : 6,233,870 B1
DATED : May 23, 2001
INVENTOR(S) : Hiroshi Horibata

It is certified that error appears in the above-identified patent and that said Letters Patent is hereby corrected as shown below:

<u>Title page,</u>
The inventor's address should be corrected to read
-- Mitaka House, No. 25-20
  5-chome, Kamirenjaku
  Mitaka-shi, Tokyo 181 (JP) --

Foreign Application Priority Data should be corrected to read
-- February 1, 1997 --

Signed and Sealed this

Twelfth Day of March, 2002

*Attest:*

*Attesting Officer*

JAMES E. ROGAN
*Director of the United States Patent and Trademark Office*